(12) United States Patent
Chan et al.

(10) Patent No.: US 11,145,104 B1
(45) Date of Patent: Oct. 12, 2021

(54) METHOD, SYSTEM AND STORAGE MEDIUM FOR PROVIDING GRAPHICAL USER INTERFACE WITH ANIMATED BACKGROUND

(71) Applicant: COMPAL ELECTRONICS, INC., Taipei (TW)

(72) Inventors: Chieh-Yu Chan, Taipei (TW); Ching-Wen Sun, Taipei (TW); Chiao-Tsu Chiang, Taipei (TW); Hao-Chen Weng, Taipei (TW); Ting-Yu Lai, Taipei (TW); Ya-Fang Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/083,331

(22) Filed: Oct. 29, 2020

(30) Foreign Application Priority Data

Jun. 4, 2020 (TW) ................................ 109118833

(51) Int. Cl.
*G06T 13/80* (2011.01)
*G09G 5/373* (2006.01)

(52) U.S. Cl.
CPC ............ *G06T 13/80* (2013.01); *G09G 5/373* (2013.01); *G06T 2200/24* (2013.01); *G09G 2340/045* (2013.01); *G09G 2340/12* (2013.01)

(58) Field of Classification Search
CPC ..... G06T 13/80; G06T 2200/74; G09G 5/373; G09G 2340/045; G09G 2340/12
See application file for complete search history.

(56) References Cited

U.S. PATENT DOCUMENTS

| | | | |
|---|---|---|---|
| 2008/0062141 A1* | 3/2008 | Chandhri | G06F 1/1694 345/173 |
| 2014/0201024 A1* | 7/2014 | Collier | G06F 3/04847 705/26.5 |
| 2020/0251073 A1* | 8/2020 | Kano | G10H 1/0008 |

* cited by examiner

*Primary Examiner* — Xilin Guo (57) ABSTRACT

A method for providing a graphical user interface with animated background, including displaying a background image in a display area and an image movable on the background image; determining whether to display an animated object according to a predetermined condition to obtain a result when the image is moved to a pre-defined visual focus; and displaying the animated object when the result indicates that it is determined to display the animated object. The image is movable along a central line of the display area, and the predetermined condition comprises that a time parameter is met. A system and a storage medium for implementing the method are also disclosed.

35 Claims, 15 Drawing Sheets

| specific condition | | animated object |
|---|---|---|
| image date | holiday A | 001 |
| image date | holiday B | 002 |
| current date | holiday A | 001 |
| current date | user birthday | 003 |
| current place | place A | 004 |

METHOD, SYSTEM AND STORAGE MEDIUM FOR PROVIDING GRAPHICAL USER INTERFACE WITH ANIMATED BACKGROUND

CROSS-REFERENCE TO RELATED APPLICATION

This non-provisional application claims priority under 35 U.S.C. § 119(a) on Patent Application No(s). 109118833 filed in Taiwan, R.O.C. on Jun. 4, 2020, the entire contents of which are hereby incorporated by reference.

BACKGROUND OF THE INVENTION

1. Field of the Invention

The present disclosure relates to methods, systems and storage media for providing a graphical user interface, and in particular to a method, system and storage medium for providing a graphical user interface with an animated background.

2. Description of the Related Art

It is always an important technical issue about software-based enhancement and hardware-based enhancement of the efficiency of users' operating graphical user interfaces. Depending on the intended applications, engineers not only design various graphical user interface functions to be performed with electronic devices but also adjust the interface operation mechanism and the message displaying process, so as to improve user experience.

For instance, conventional applications for displaying pictures mostly sort pictures in sequence. When a user views pictures, user interfaces of the applications are incapable of automatically adjusting the contents being displayed on the screen according to the pictures being viewed by the user. As a result, the user interfaces look monotonous to the detriment of user experience. Therefore, it is important to provide a solution for adjusting a graphical user interface automatically and dynamically according to the contents being viewed by a user, so as to improve user experience.

BRIEF SUMMARY OF THE INVENTION

The present disclosure provides a method for providing a graphical user interface, comprising the steps of: displaying on a display area a background picture and at least one image movable on the background picture, the image is associated with a time and/or location; determining whether to display an animated object according to a predetermined condition to obtain a result when the image moves to a visual focus area; and displaying the animated object when the result indicates that it is determined to display the animated object, wherein the image moves along a central line of the display area, and the predetermined condition comprises that a time parameter is met.

In an embodiment, a plurality of images is displayed on the display area, and the images are arranged along the central line according to their associated times.

In an embodiment, the image is associated with a time, and the predetermined condition comprises a time parameter that the time of the image must match in order to satisfy the predetermined condition. The time parameter is, for example, a specific time, a specific date, or a specific holiday. When the image is associated with a target, the time parameter is a specific date pertaining to the target. In an embodiment, the predetermined condition comprises that a current location matches a specific location.

In an embodiment, the method further comprises selecting the animated object from an animated object gallery according to the predetermined condition.

In an embodiment, the image has a larger size when the image is within the visual focus area, and the visual focus area encompasses the center of the display area. The center of the visual focus area is disposed on the central line but does not overlap the center of the display area. The display area is more than two times larger than the visual focus area.

In an embodiment, both the display area and the visual focus area are rectangular in shape, the central line is parallel to two long sides of the display area, and two lateral sides of the visual focus area are flush with the two long sides of the display area, respectively.

In an embodiment, the animated object comprises an animated element whose shape is variable within the visual focus area, such as a picture of fireworks expanding outward or a picture of petals expanding outward. Alternatively, the animated object comprises an animated element movable within the visual focus area, such as one which moves around the image within the visual focus area. The step of displaying the animated object comprises replacing the background picture with the animated object.

In another embodiment, a system for providing a graphical user interface, comprises a display device, a processor and a storage device. The display device has a display area. The storage device stores a plurality of program commands, wherein after executing the program commands, the processor performs the steps of: displaying on a display area a background picture and at least one image movable across the background picture; determining whether to display an animated object according to a predetermined condition to obtain a result when the image moves to a pre-defined visual focus area; and displaying the animated object when the result indicates that it is determined to display the animated object. The image moves along a central line of the display area, and the predetermined condition comprises that a time parameter is met.

In another embodiment, a non-transient storage medium stores a plurality of program commands executable by a processor of a system, so as for the processor to perform the steps of: displaying on a display area a background picture and at least one image movable on the background picture; determining whether to display an animated object according to a predetermined condition to obtain a result when the image moves to a pre-defined visual focus area; and displaying the animated object when the result indicates that it is determined to display the animated object, wherein the image moves along a central line of the display area, and the predetermined condition comprises that a time parameter is met.

In the aforesaid embodiments, images are movable within the graphical user interface in a specific way, and different animated pictures are automatically displayed according to a predetermined condition and the images which the user has moved to the visual focus area. Therefore, the present disclosure greatly improves user experience.

DETAILED DESCRIPTION OF THE INVENTION

To facilitate understanding of the object, characteristics and effects of this present disclosure, embodiments together with the attached drawings for the detailed description of the present disclosure are provided.

Figure 1:
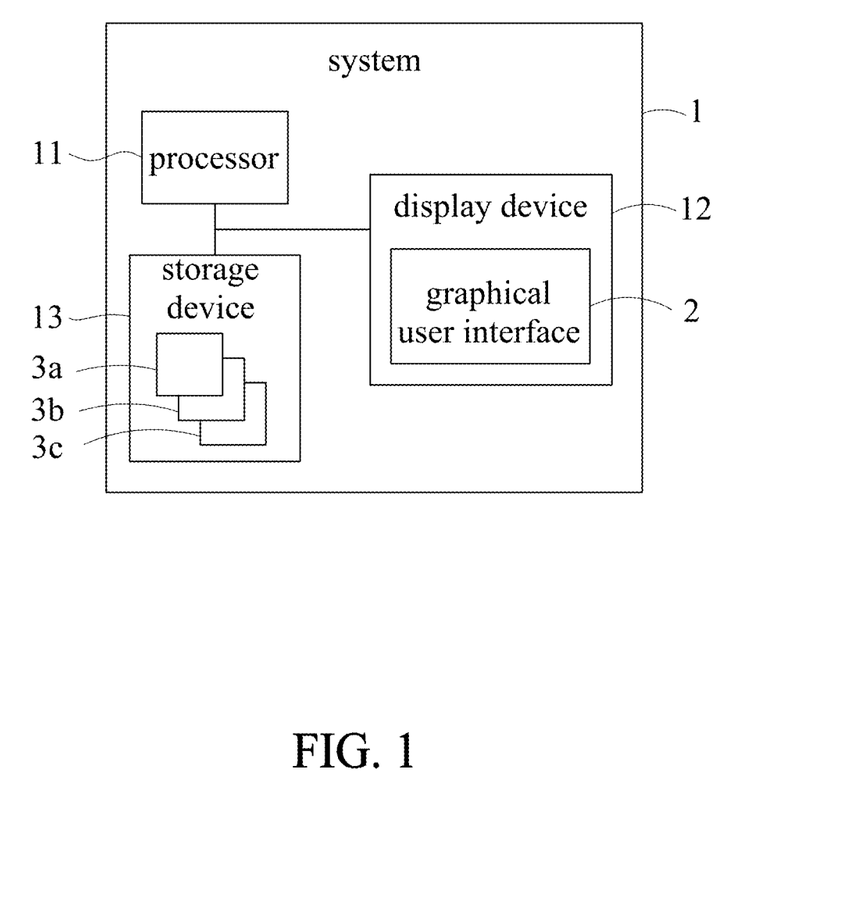
FIG. 1 is a schematic view of a system for providing a graphical user interface with an animated background according to an embodiment of the present disclosure.

Referring to FIG. 1, a system 1 for providing a graphical user interface with an animated background according to an embodiment of the present disclosure comprises a processor 11, a display device 12, and a storage device 13. In this embodiment, the system 1 operates on a mobile electronic device, such as a smartphone or a tablet. The processor 11 is a main processor of a mobile electronic device. The display device 12 is a touchscreen which displays a graphical user interface 2 and converts a user's touch into a control signal. The storage device 13 is a non-transient memory, such as flash memory or any other types of memory. The storage device 13 stores program commands executable by the processor 11. After the program commands are executed by the processor 11, the corresponding steps are performed. The storage device 13 further stores a plurality of images 3a-3c. The images 3a-3c are pictures previously taken by the user. Each of the images 3a-3c is associated with a time or time parameter. The images 3a-3c can be shown in the graphical user interface 2 displayed on the display device 12.

Figure 2:
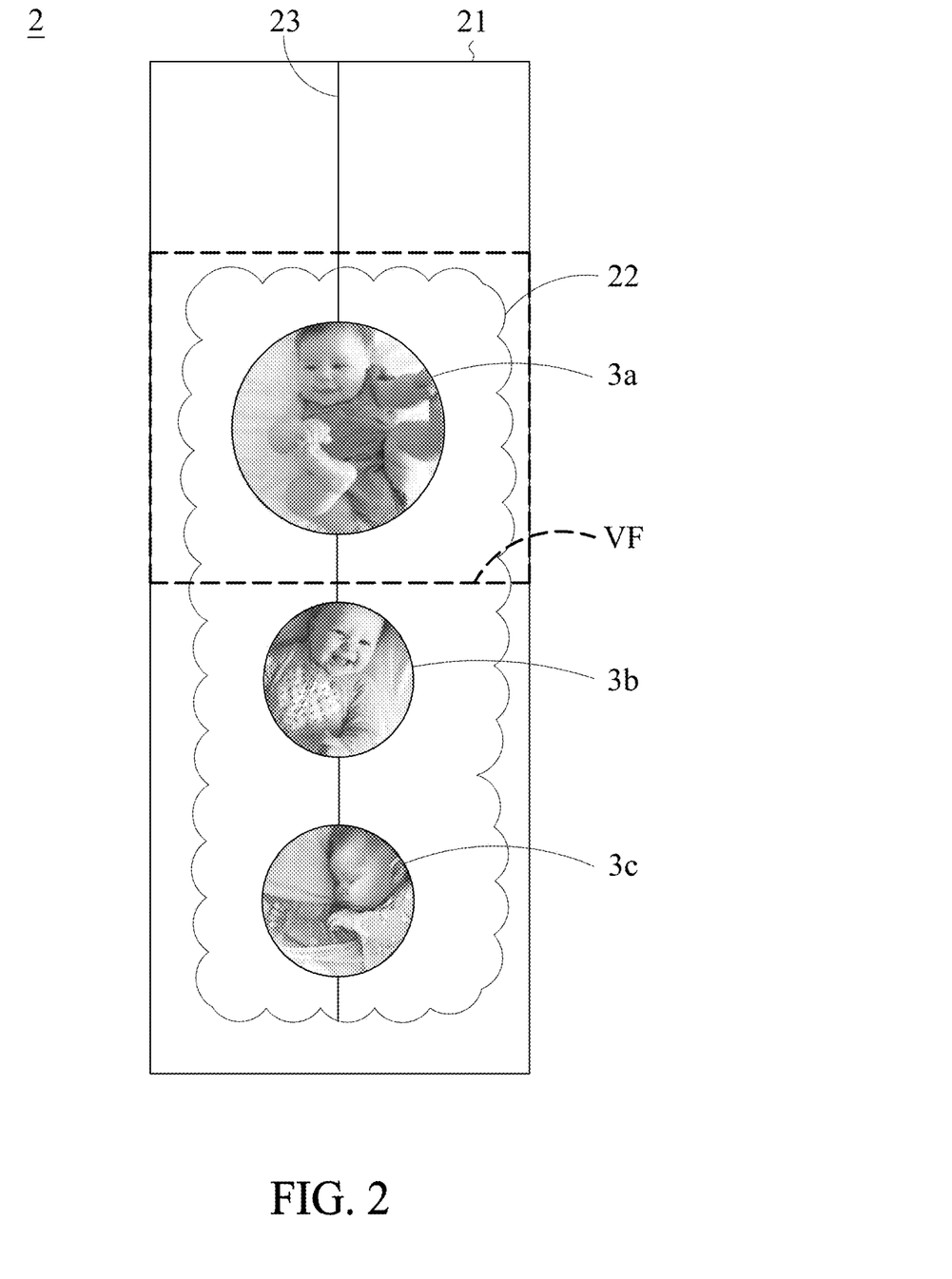
FIG. 2 is a schematic view of a display screen showing the graphical user interface according to an embodiment of the present disclosure.

Referring to FIG. 2, in this embodiment, after executing the program commands stored in the storage device 13, the processor 11 displays a background picture 22 in a display area 21 of the graphical user interface 2 and displays the images 3a-3c stored in the storage device 13 on the background picture 22. The images 3a-3c on the background picture 22 move along a central line 23 of the display area 21, and the user can touch one of the images 3a-3c and move it across the background picture 22 along the central line 23, thereby changing the positions of the images 3a-3c on the background picture 22 along the central line 23.

The display area 21 is rectangular in shape. The images 3a-3c are automatically arranged according to their associated times parameters along the central line 23 parallel to the long sides of the display area 21. For instance, the image 3a located at the uppermost portion on the central line 23 is associated with the earliest time, but the image 3c located at the lowermost portion on the central line 23 is associated with the latest time. The time parameters, which the images 3a-3c are associated with, for example, can be set by the system 1 or the user in advance, and can be the time at which the images 3a-3c were taken, or the time determined in whatever manner. For instance, in an embodiment, the system 1 allows the user to upload images respectively corresponding to calendar dates, so as to create an image diary. After the images respectively corresponding to the calendar dates are uploaded, the system 1 automatically creates associations between the calendar dates and the uploaded images, thereby associating each of the images with a time or time parameter.

Figure 3A:
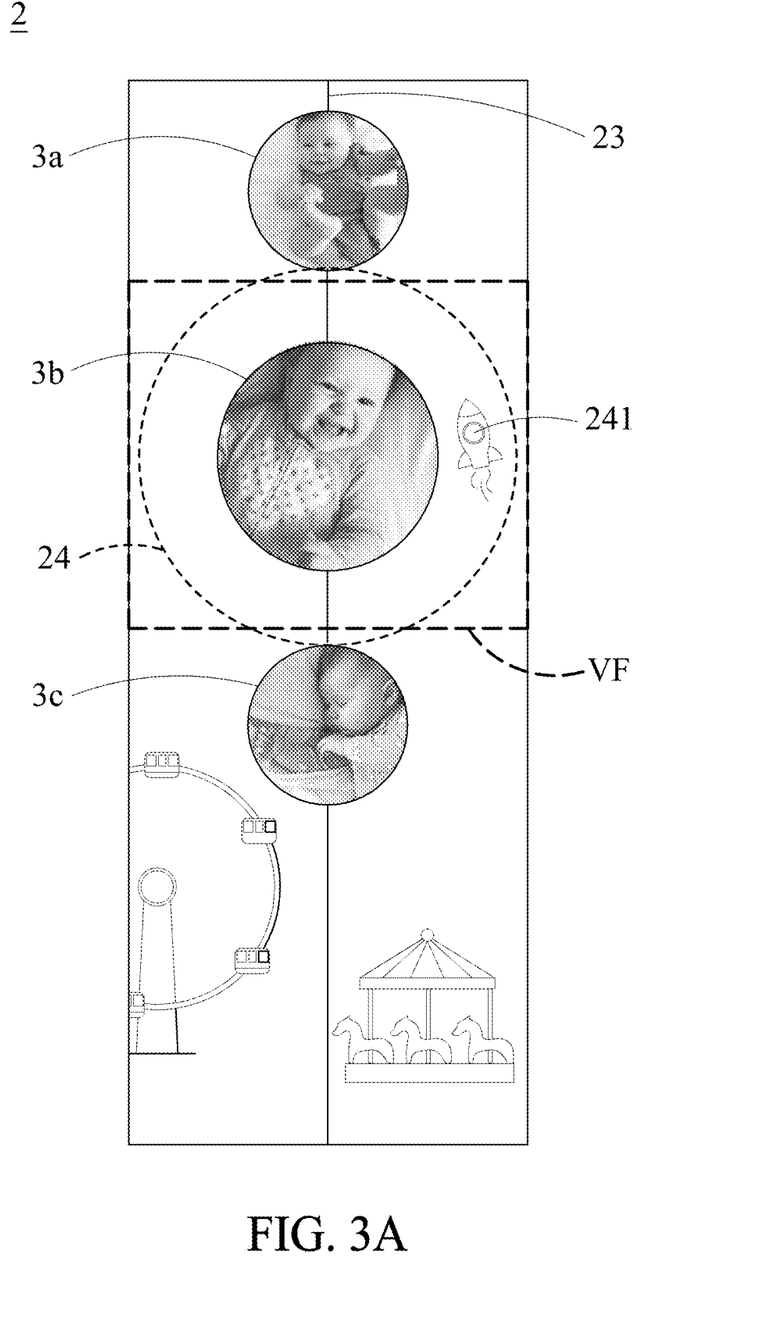
FIG. 3A is a schematic view showing animated objects and animated elements displayed on the graphical user interface according to an embodiment of the present disclosure.
Figure 3B:
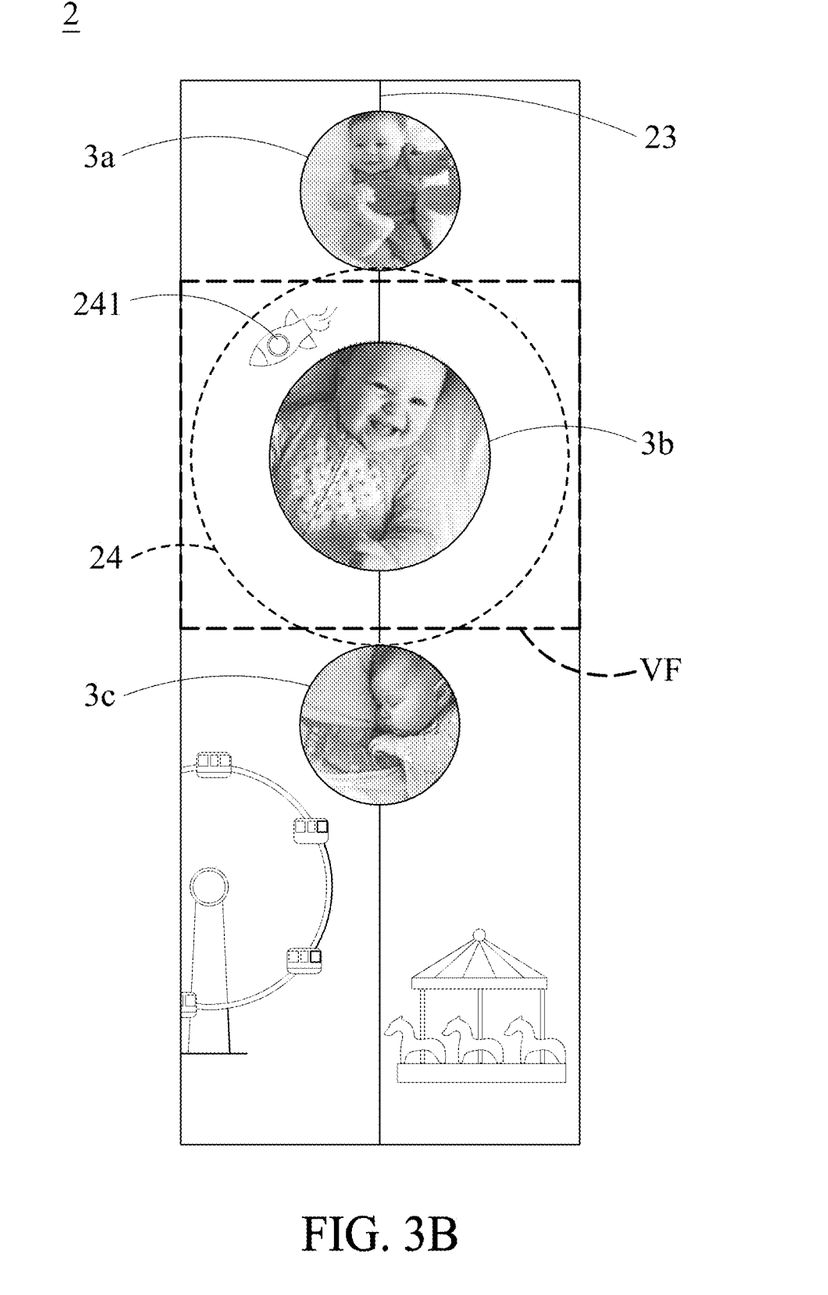
FIG. 3B is a schematic view showing animated objects and animated elements displayed on the graphical user interface according to an embodiment of the present disclosure.
Figure 3C:
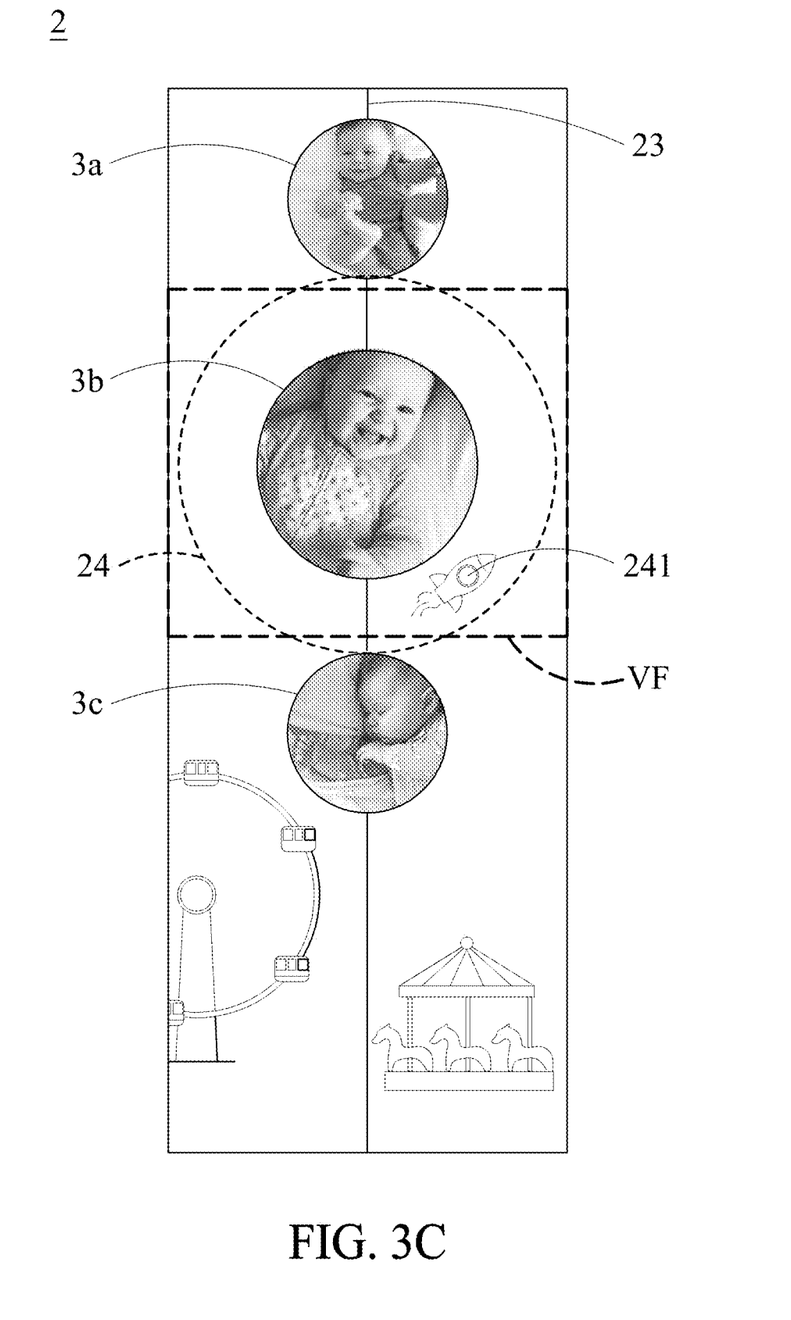
FIG. 3C is a schematic view showing animated objects and animated elements displayed on the graphical user interface according to an embodiment of the present disclosure.

When one of the images 3a-3c is moved along the central line 23 of the display area 21 to a pre-defined visual focus area VF, the system 1 determines whether to display an animated object 24 according to a predetermined condition. For instance, as shown in FIG. 3A, when the user moves the image 3b upward to the visual focus area VF, the system 1 determines that the image 3b meets the predetermined condition, thereby displaying the animated object 24. Referring to FIG. 3B and FIG. 3C, the animated object 24 comprises an animated element 241 confined to the visual focus area VF and moving around the image 3b. The animated element 241 of the animated object 24 is confined to the visual focus area VF and thus draws the user's attention, so as to improve user experience.

In this embodiment, the predetermined condition comprises that the time parameter, which is associated with the image located within the visual focus area VF, is met. For instance, the system 1 determines whether the time parameter associated with the image 3b located within the visual focus area VF is a specific holiday in order to obtain a result. If the result indicates that the time is a specific holiday, the system 1 will display an animated object pertaining to the specific holiday. In a variant embodiment, the predetermined condition includes that the current date on which the user uses the system 1 is a specific date, such as a specific holiday, a user's birthday, or a specific date of the peak during a pandemic. Alternatively, the predetermined condition includes the location of the system 1. Alternatively, the predetermined condition comprises that the current location of the system 1 matches a specific location, such as an amusement park or an unforgettable place for a user.

When an image is associated with a target, a specific time parameter can be a specific date pertaining to the target. For instance, if the target is a newborn, the system 1 will record the newborn's personal particulars, including birthday, and calculate a specific time parameter pertaining to the newborn, such as the date on which the newborn will turn one month old or will have to receive a vaccination.

Figure 7:
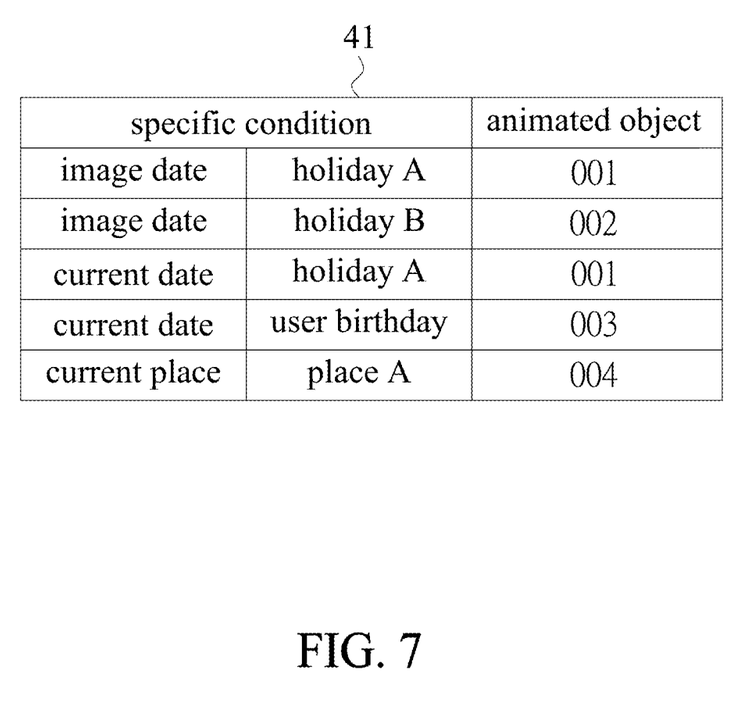
FIG. 7 is a schematic view of an animated object gallery according to an embodiment of the present disclosure.

Referring to FIG. 7, the storage device 13 stores therein an animated object gallery 41 for recording a correlation between a predetermined condition and an animated object. For instance, the animated object gallery 41 is divided into condition categories, namely an image date, a current date, and a current location, and the condition categories correspond to respective condition results, namely a holiday A, a user's birthday, and a place A. Each condition category and a corresponding condition result are combined to form a predetermined condition and correspond to a respective animated object.

In an embodiment, the visual focus area VF is the main area located within the display area, designed to draw the user's attention, pre-defined by the system 1, and recorded in the storage device 13. For instance, as shown in FIG. 2, the system 1 pre-defines that the center of the visual focus area VF is disposed on the central line 23 but slightly above, rather than overlapping, the center of the display area 21. Thus, in the storage device 13, the visual focus area VF is pre-defined and recorded as an area located slightly above the center of the display area 21. Both the visual focus area VF and the display area 21 are rectangular in shape. The display area 21 is more than two times larger than the visual focus area VF. The two long sides of the display area 21 are parallel to the central line 23. The two lateral sides of the visual focus area VF are flush with the two long sides of the display area 21, respectively. Therefore, when the user uses the system 1, the visual focus that the user pays attention to in the display area 21 is slightly above the center of the display area 21.

In an embodiment, the image located within the visual focus area VF is larger than the images not located within the visual focus area VF. For instance, as shown in FIG. 2, the image 3a is located within the visual focus area VF and thus larger than the images 3b, 3c that are not located within the visual focus area VF. Referring to FIG. 3A-FIG. 3C, the image 3b is located within the visual focus area VF and thus larger than the image 3a that is located outside of the visual focus area VF.

In an embodiment, the animated object 24 comprises the animated element 241 confined to the visual focus area VF and moving around the image. Since the animated element 241 is displayed within the visual focus area VF, the animated element 241 and the image within the visual focus area VF draw the user's attention.

Figure 4A:
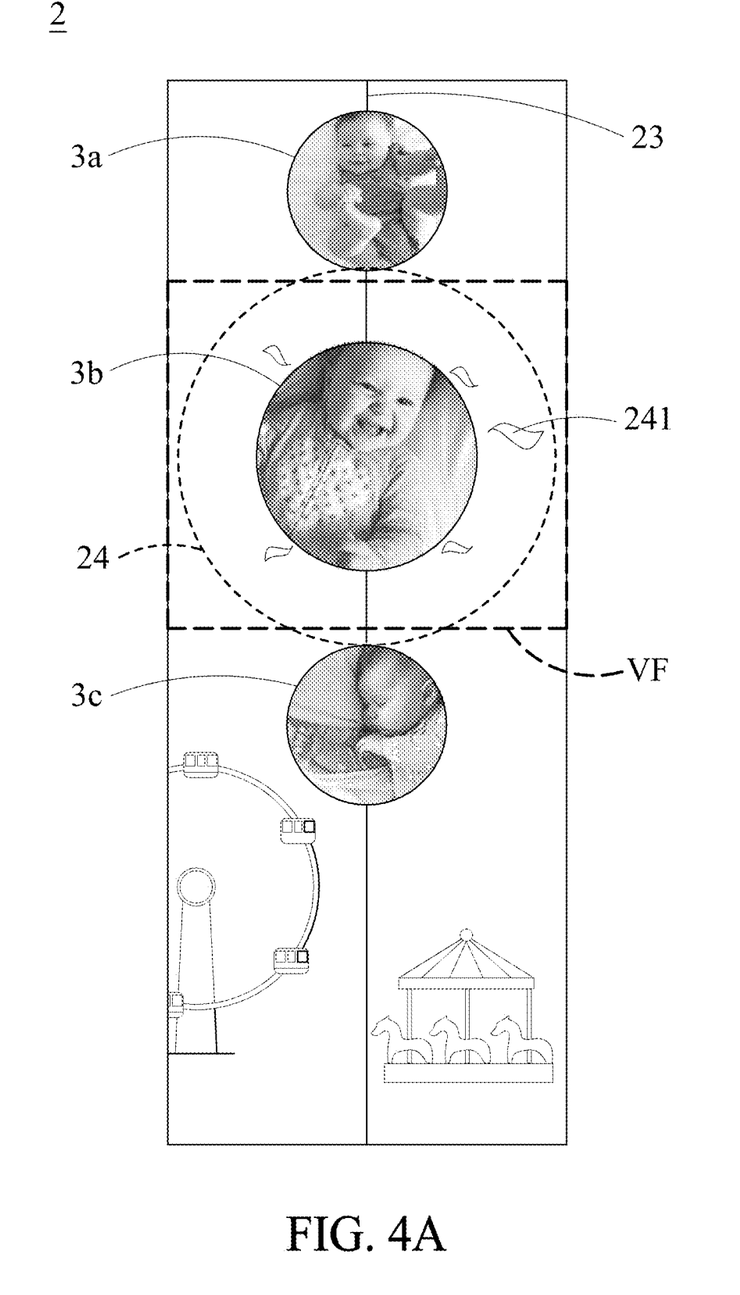
FIG. 4A is a schematic view showing animated objects and animated elements displayed on the graphical user interface according to another embodiment of the present disclosure.
Figure 4B:
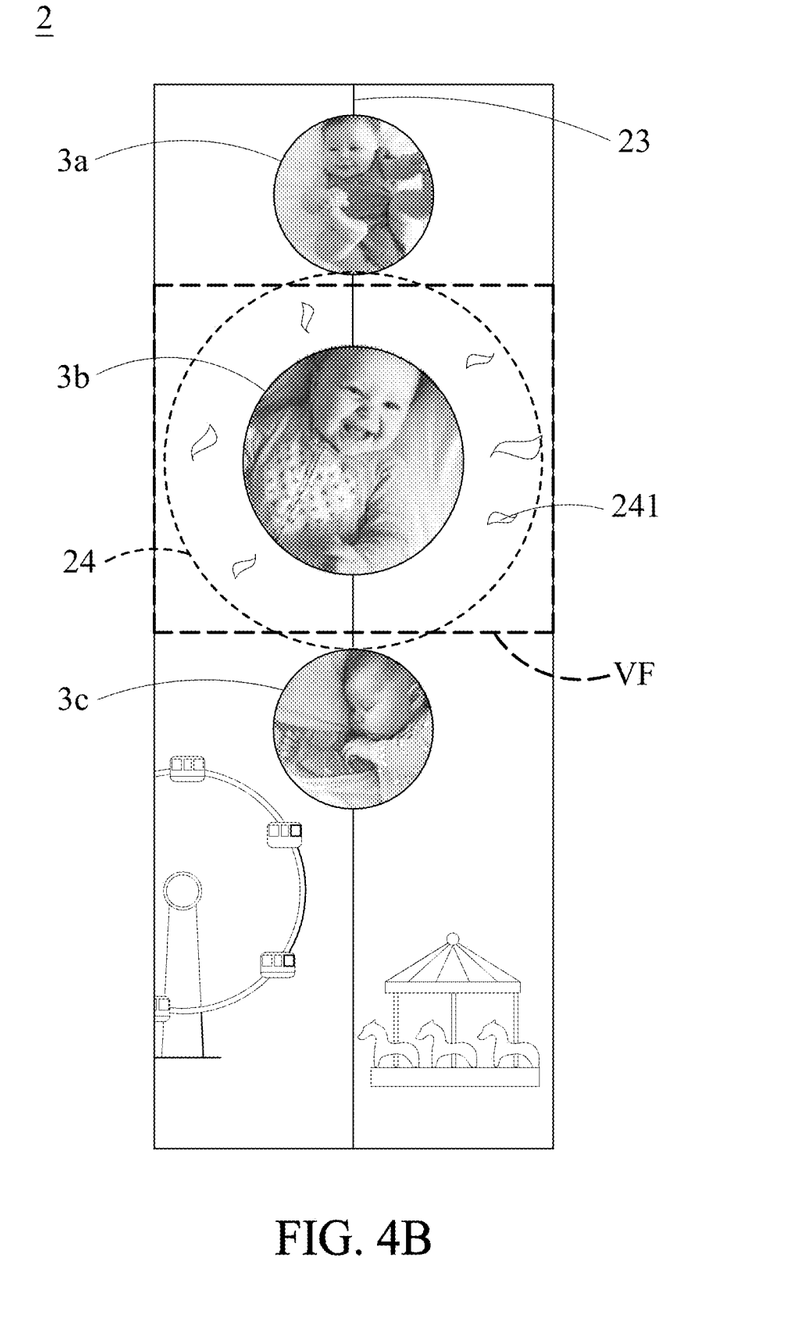
FIG. 4B is a schematic view showing animated objects and animated elements displayed on the graphical user interface according to another embodiment of the present disclosure.
Figure 4C:
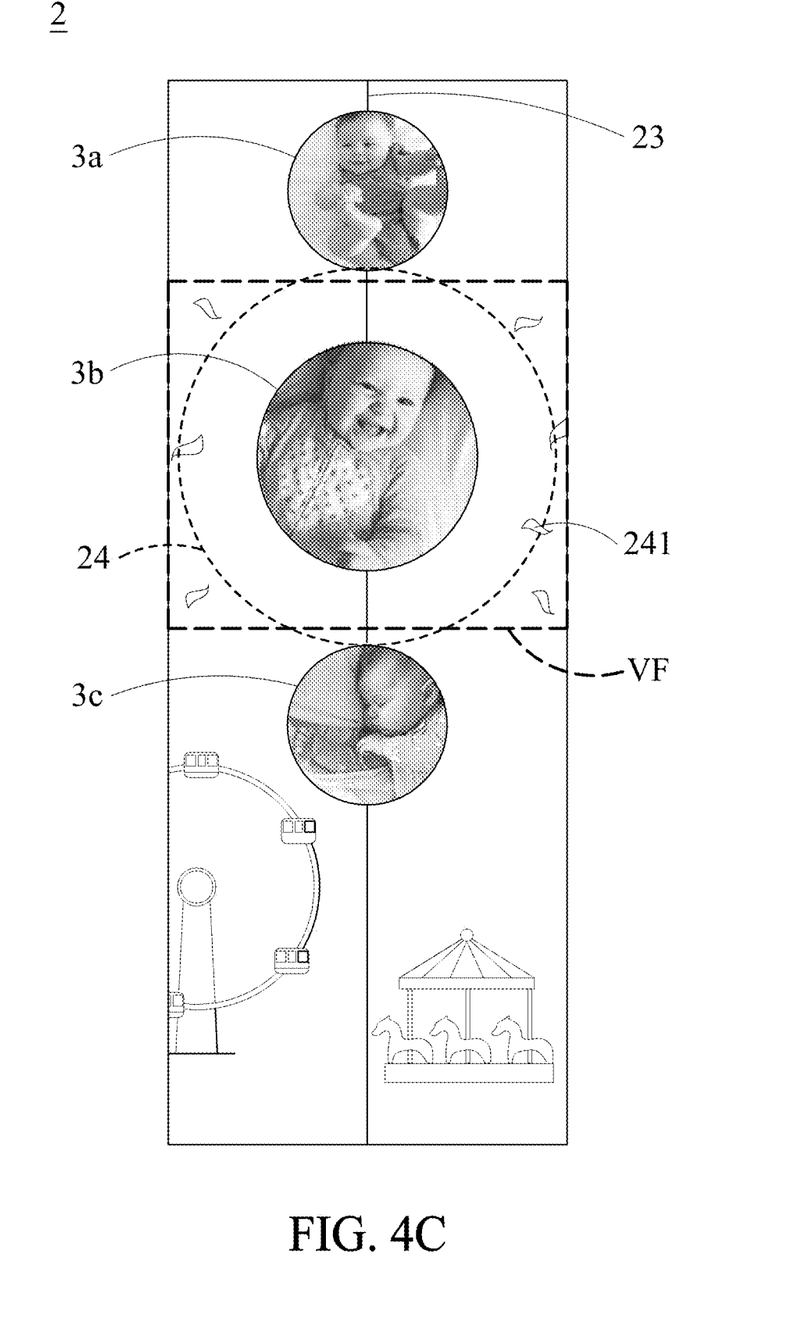
FIG. 4C is a schematic view showing animated objects and animated elements displayed on the graphical user interface according to another embodiment of the present disclosure.
Figure 5A:
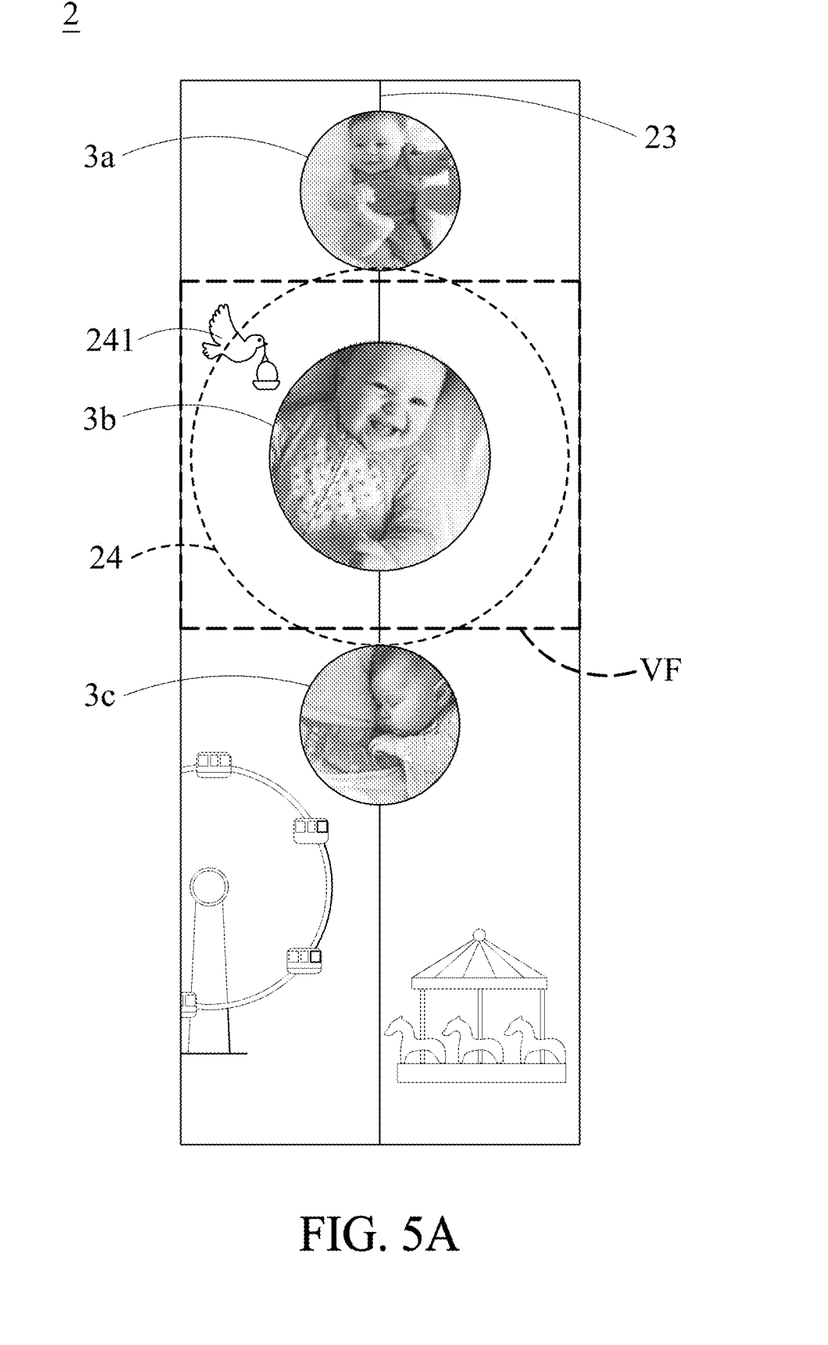
FIG. 5A is a schematic view showing animated objects and animated elements displayed on the graphical user interface according to another embodiment of the present disclosure.
Figure 5B:
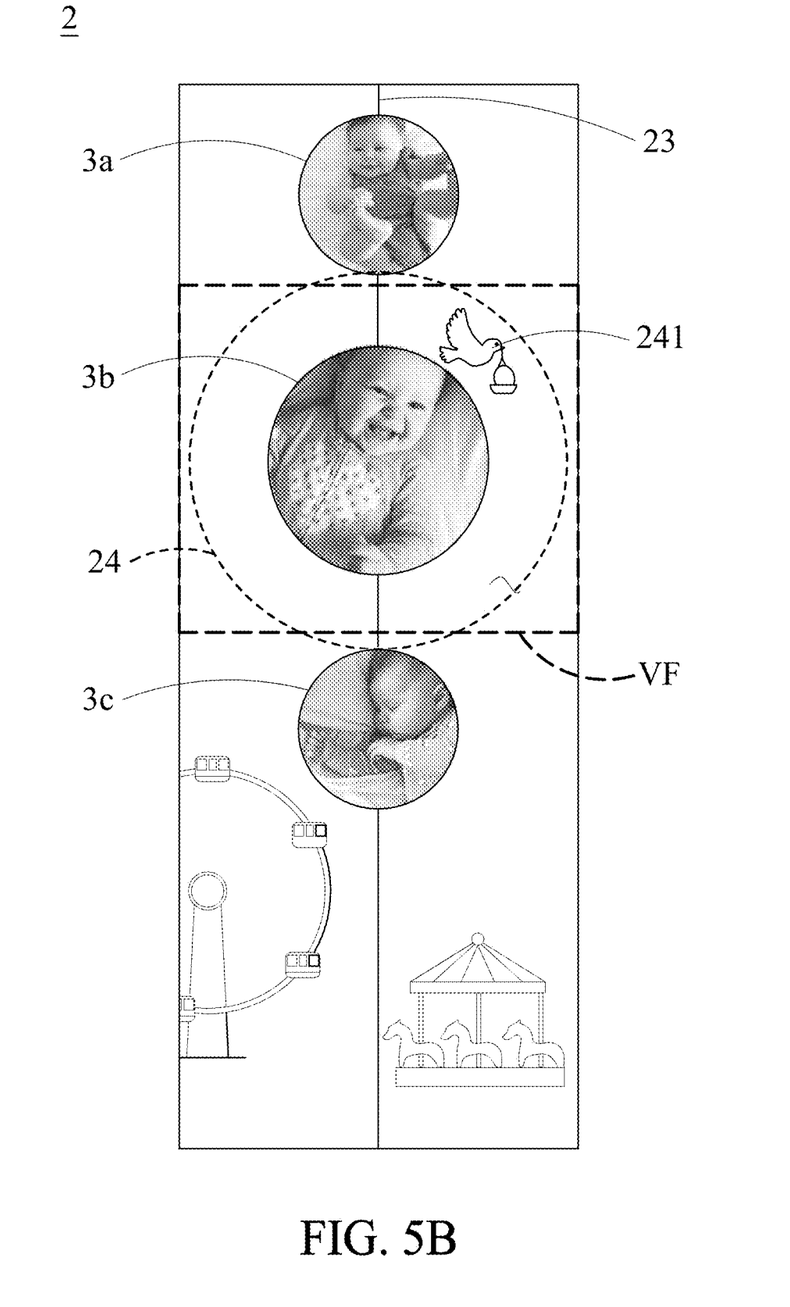
FIG. 5B is a schematic view showing animated objects and animated elements displayed on the graphical user interface according to another embodiment of the present disclosure.
Figure 5C:
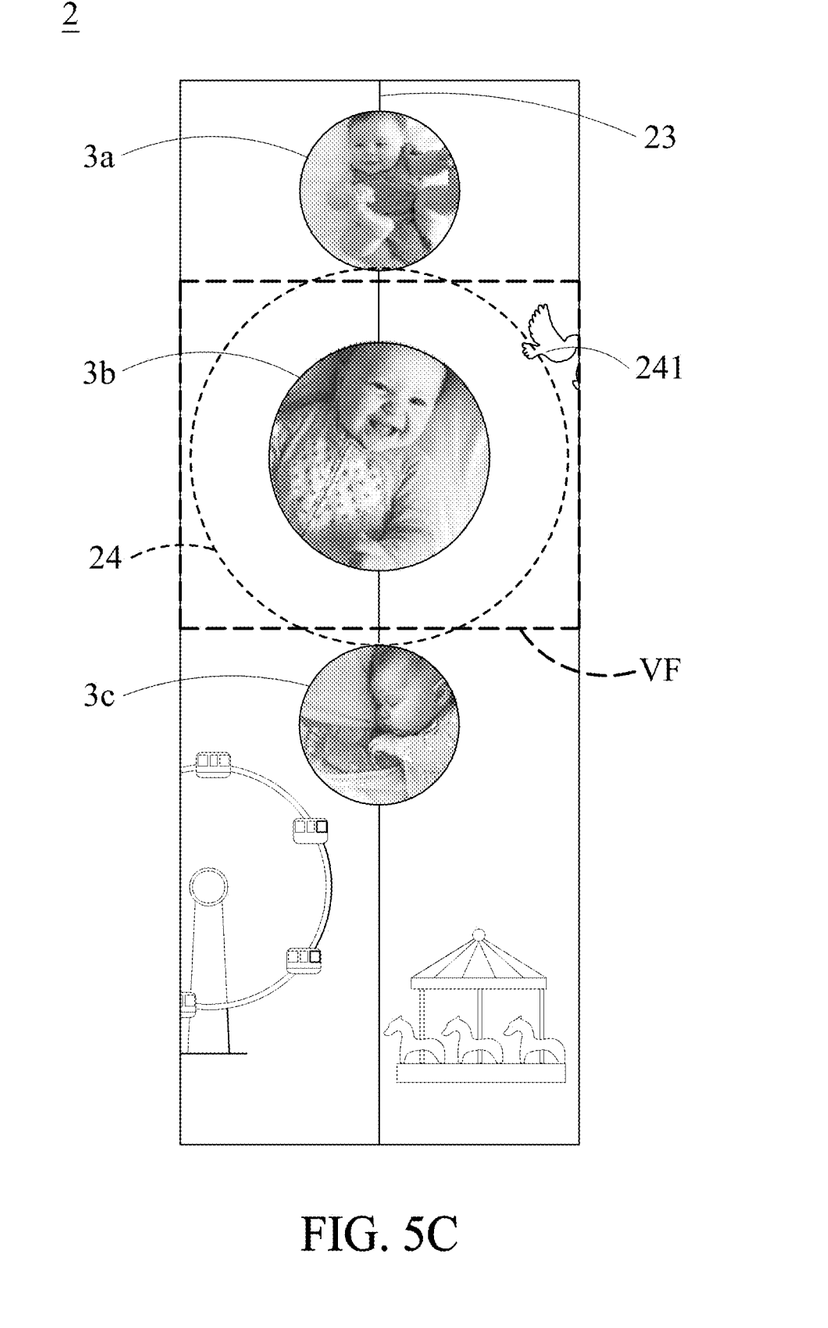
FIG. 5C is a schematic view showing animated objects and animated elements displayed on the graphical user interface according to another embodiment of the present disclosure.
Figure 6A:
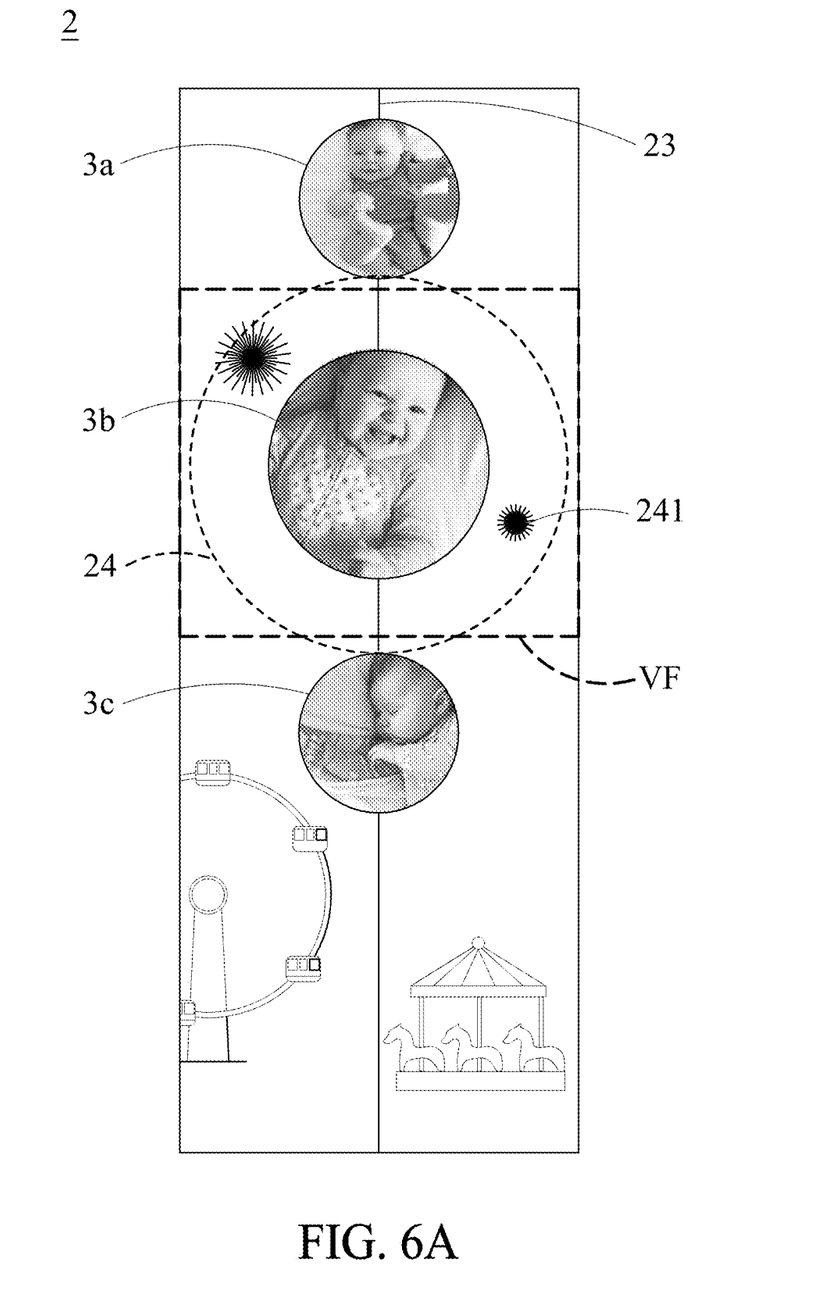
FIG. 6A is a schematic view showing animated objects and animated elements displayed on the graphical user interface according to an embodiment of the present disclosure.
Figure 6B:
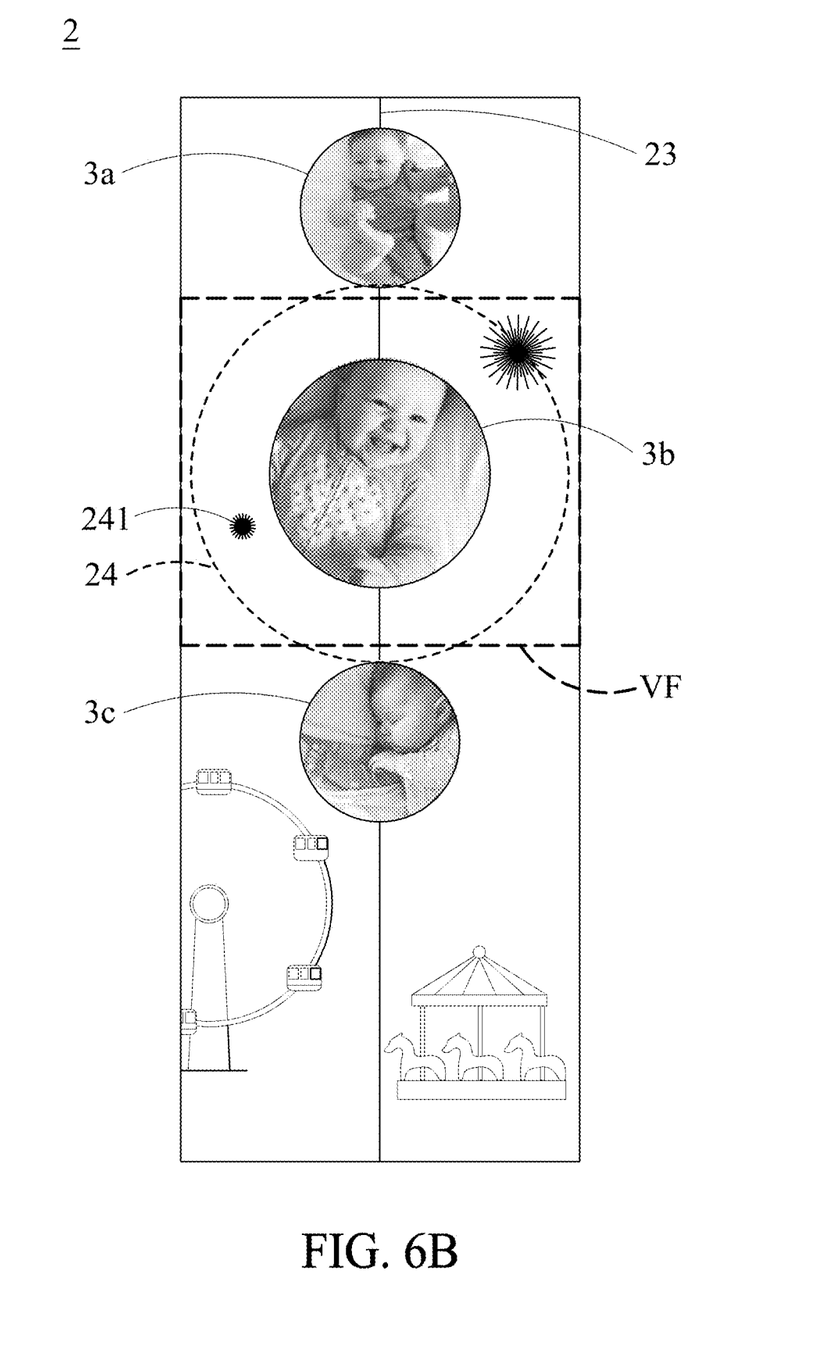
FIG. 6B is a schematic view showing animated objects and animated elements displayed on the graphical user interface according to an embodiment of the present disclosure.
Figure 6C:
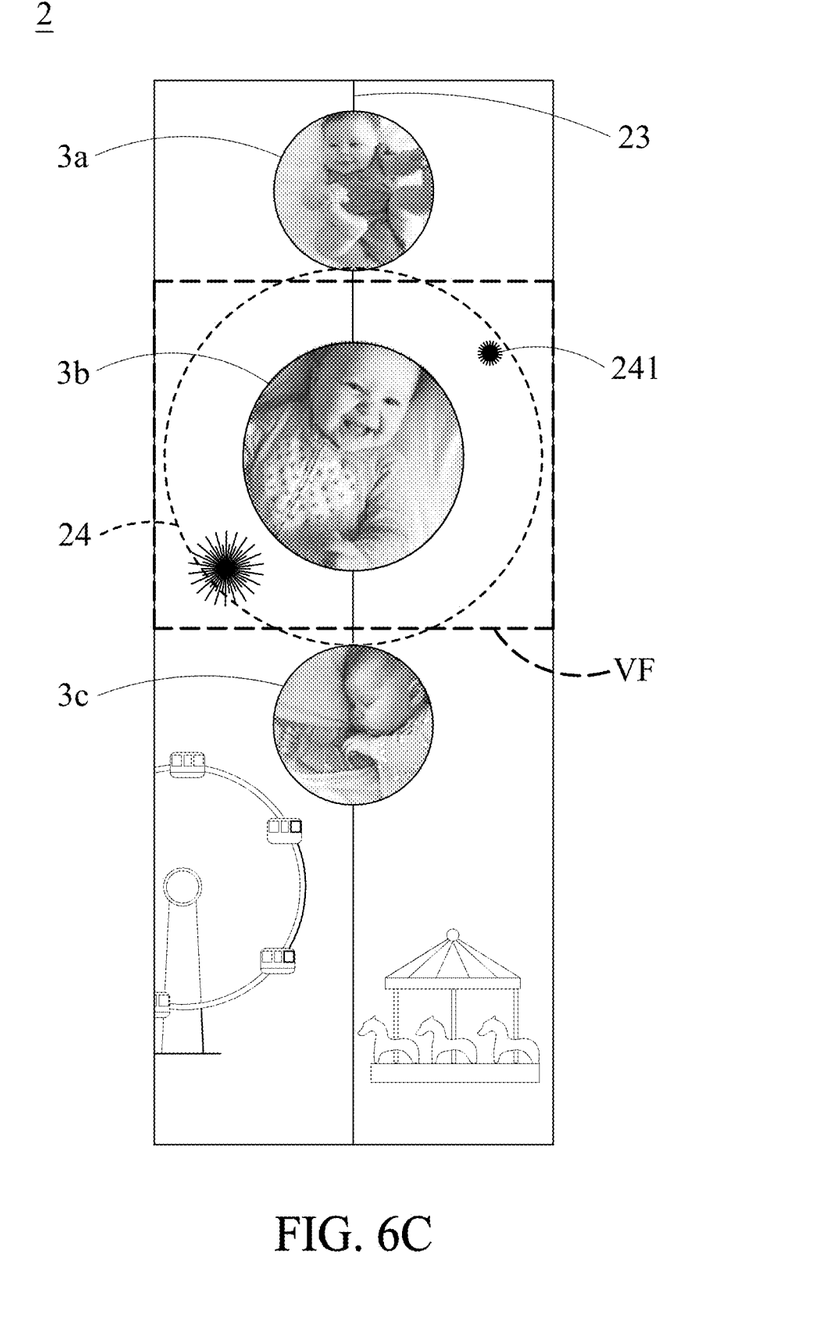
FIG. 6C is a schematic view showing animated objects and animated elements displayed on the graphical user interface according to an embodiment of the present disclosure.

In another embodiment, the animated element 241 of the animated object 24 is in a different shape, moves in a different way, or is any other type of an element. For instance, referring to FIG. 4A-FIG. 4C, the animated element 241 of the animated object 24 is a plurality of petals which expand outward randomly within the visual focus area VF. For instance, referring to FIG. 5A-FIG. 5C, the animated element 241 is a picture moving across the visual focus area VF and passing the rear of the image, for example, a picture of a stork moving from the left to the right. For instance, referring to FIG. 6A-FIG. 6C, the animated element 241 is a picture of fireworks, depicting random appearance and disappearance of the fireworks. The aforesaid three examples may be combined. For instance, the plurality of petals is combined with the fireworks. There are various correlations between predetermined conditions and the animated objects; thus, the user can see variations associated with predetermined conditions within the visual focus area, so as to improve user experience in operating the graphical user interface.

To display the animated element 241 of the animated object 24, the graphical layer of the animated object 24 is different from that of the background picture 22. The graphical layer of the animated object 24 covers the background picture 22 from above. When the predetermined condition is not met due to the movement of the image, the graphical layer of the animated object 24 will be removed so as to display the background picture 22 again. In another embodiment, the background picture 22 is replaced with an animated picture of the animated object 24 (i.e., using an animated picture of the animated object 24 as the background picture 22 and displaying it) in the display area 21). When the predetermined condition is not met due to the movement of the image, an animated picture of the animated object 24 will be replaced with the initial background picture 22.

In the aforesaid embodiments, images are movable within the graphical user interface, and the system automatically displays different animated pictures in the visual focus area according to the predetermined condition and the images which the user has moved to the visual focus area. Therefore, the present disclosure greatly improves user experience.

While the present disclosure has been described by means of specific embodiments, numerous modifications and variations could be made thereto by those skilled in the art without departing from the scope and spirit of the present disclosure set forth in the claims.

What is claimed is:

1. A method for providing a graphical user interface, comprising the steps of:
    displaying on a display area a background picture and at least one image movable on the background picture;
    determining whether to display an animated object according to a predetermined condition to obtain a result when the image moves to a visual focus area; and
    displaying the animated object when the result indicates that it is determined to display the animated object,
    wherein the image moves along a central line of the display area, and the predetermined condition comprises a time parameter.

2. The method of claim 1, wherein the predetermined condition comprises that the time parameter is a specific time.

3. The method of claim 1, wherein the image is arranged along the central line according to the time parameter.

4. The method of claim 1, wherein the time parameter is a specific holiday.

5. The method of claim 1, wherein the image is associated with a target, and the time parameter is a specific date pertaining to the target.

6. The method of claim 1, wherein the predetermined condition comprises that a current location matches a specific location.

7. The method of claim 1, further comprising selecting the animated object from an animated object gallery according to the predetermined condition.

8. The method of claim 1, wherein the image has a larger size when the image is within the visual focus area than when the image is outside the visual focus area.

9. The method of claim 1, wherein the visual focus area encompasses a center of the display area.

10. The method of claim 1, wherein a center of the visual focus area is disposed on the central line but does not overlap a center of the display area.

11. The method of claim 1, wherein the display area is more than two times larger than the visual focus area.

12. The method of claim 1, wherein both the display area and the visual focus area are rectangular in shape, the central line is parallel to two long sides of the display area, and two lateral sides of the visual focus area are flush with the two long sides of the display area, respectively.

13. The method of claim 1, wherein the animated object comprises an animated element whose shape is variable within the visual focus area.

14. The method of claim 13, wherein the animated element comprises a picture of fireworks expanding outward or a picture of petals expanding outward, within the visual focus area.

15. The method of claim 1, wherein the animated object comprises an animated element movable within the visual focus area.

16. The method of claim 15, wherein the animated element moves around the image within the visual focus area.

17. The method of claim 1, wherein the step of displaying the animated object comprises replacing the background picture with the animated object.

18. A system for providing a graphical user interface, comprising:
   a display device having a display area;
   a processor; and
   a storage device for storing a plurality of program commands, wherein after executing the program commands, the processor performs the steps of:
   displaying on a display area a background picture and at least one image movable across the background picture;
   determining whether to display an animated object according to a predetermined condition to obtain a result when the image moves to a visual focus area; and
   displaying the animated object when the result indicates that it is determined to display the animated object,
   wherein the image moves along a central line of the display area, and the predetermined condition comprises a time parameter.

19. The system of claim 18, wherein the image is associated with a time, and the predetermined condition comprises that the time matches the time parameter.

20. The system of claim 18, wherein the image is arranged along the central line according to the time parameter.

21. The system of claim 18, wherein the image is associated with a target, and the time parameter is a specific date pertaining to the target.

22. The system of claim 18, wherein after executing the program commands, the processor performs a step of selecting the animated object from an animated object gallery according to the predetermined condition.

23. The system of claim 18, wherein after executing the program commands, the processor performs a step of enlarging the image when the image is within the visual focus area.

24. The system of claim 18, wherein a center of the visual focus area is disposed on the central line but does not overlap a center of the display area.

25. The system of claim 18, wherein the animated object comprises an animated element whose shape is variable within the visual focus area.

26. A non-transient storage medium for storing a plurality of program commands executable by a processor of a system, so as for the processor to perform steps of:
   displaying on a display area a background picture and at least one image movable on the background picture;
   determining whether to display an animated object according to a predetermined condition to obtain a result when the image moves to a visual focus area; and
   displaying the animated object when the result indicates that it is determined to display the animated object,
   wherein the image moves along a central line of the display area, and the predetermined condition comprises a time parameter.

27. The non-transient storage medium of claim 26, wherein the image is associated with a time, and the predetermined condition comprises that the time matches the time parameter.

28. The non-transient storage medium of claim 26, wherein the image is arranged along the central line according to the time parameter.

29. The non-transient storage medium of claim 26, wherein the image is associated with a target, and the time parameter is a specific date pertaining to the target.

30. The non-transient storage medium of claim 26, wherein after executing the program commands, the processor of the system performs a step of selecting the animated object from an animated object gallery according to the predetermined condition.

31. The non-transient storage medium of claim 26, wherein after executing the program commands, the processor of the system performs a step of enlarging the image when the image is within the visual focus area.

32. The non-transient storage medium of claim 26, wherein a center of the visual focus area is disposed on the central line but does not overlap a center of the display area.

33. The non-transient storage medium of claim 26, wherein the animated object comprises an animated element whose shape is variable within the visual focus area.

34. The non-transient storage medium of claim 26, wherein the animated object comprises an animated element movable within the visual focus area.

35. The non-transient storage medium of claim 34, wherein the animated element moves around the image within the visual focus area.

* * * * *